United States Patent [19]

Nagano

[11] Patent Number: 4,606,620
[45] Date of Patent: Aug. 19, 1986

[54] DEVICE FOR COOLING REFLECTING MIRROR

[75] Inventor: Yasuaki Nagano, Matsutoh, Japan

[73] Assignee: Shibuya Kogyo Co., Ltd., Kanazawa, Japan

[21] Appl. No.: 787,839

[22] Filed: Oct. 16, 1985

[51] Int. Cl.⁴ .............................................. G03B 5/08
[52] U.S. Cl. .................................................. 350/610
[58] Field of Search ...................... 350/609, 600, 610

[56] References Cited

U.S. PATENT DOCUMENTS

| | | | |
|---|---|---|---|
| 3,731,992 | 5/1973 | Mansell | 350/610 |
| 3,909,118 | 9/1975 | Schmidt | 350/610 |
| 3,986,768 | 10/1976 | Peters et al. | 350/610 |
| 4,003,641 | 1/1977 | Heinz et al. | 350/610 |

FOREIGN PATENT DOCUMENTS 142520  8/1984  Japan .

*Primary Examiner*—Donald Watkins
*Attorney, Agent, or Firm*—Flynn, Thiel, Boutell & Tanis

[57] ABSTRACT

A device for cooling a reflecting mirror for reflecting a laser beam is disclosed. A porous member, which permits flow of a cooling fluid through it and has a high thermal conductivity, is held in contact with the reflecting mirror to be cooled. The porous member has a bore coincident with the center of the reflecting surface of the reflecting mirror, at which the laser beam is reflected, and is open on the side opposite the reflecting mirror. Cooling fluid is permitted to flow into the porous member through the bore thereof to improve the heat exchange between the cooling fluid and reflecting mirror, thus improving the cooling capacity and also permitting effective cooling of the reflecting portion of the reflecting mirror, at which the laser beam is reflected.

7 Claims, 2 Drawing Figures

DEVICE FOR COOLING REFLECTING MIRROR

FIELD OF THE INVENTION

This invention relates to a reflecting mirror cooling device and, more particularly, to a device for cooling a reflecting mirror for reflecting a laser beam.

DESCRIPTION OF THE PRIOR ART

In a laser apparatus, particularly in a high output laser apparatus, a reflecting mirror for reflecting a laser beam is heated by the laser beam. Therefore, it is necessary to cool the reflecting mirror. Heretofore, the reflecting mirror is cooled by providing a cooling water passage in the vicinity of it or by directly blowing air against it. With such prior art cooling devices, however, the cooling capacity is liable to be insufficient, and it has been desired to improve the cooling capacity.

Japanese Patent Laid-Open No. 142,520/1984 discloses a cooling device for cooling a condenser lens for converging a laser beam. In this device, a porous member of a sintered metal or the like having a high thermal conductivity is held in contact with the outer periphery of the condenser lens, and cooling is caused to flow through the porous member. From this structure, it may be thought to hold a porous member on the back side of a reflecting mirror, i.e., on the side thereof opposite the reflecting surface, and cause cooling air to flow through the porous member from the afore-said side to the outer periphery to thereby cool the reflecting mirror.

However, by merely holding the porous member in contact with the reflecting mirror to cause air flow through it, much of cooling air will flow from the edge portion of the afore-said side which offers less resistance against flow through the porous member to the outer periphery thereof. Therefore, a central portion of the reflecting mirror, at which the laser beam is reflected so that it is readily heated by the laser beam, is cooled insufficiently.

SUMMARY OF THE INVENTION

An object of the invention is to provide a reflecting mirror cooling device having high cooling capacity, which can sufficiently cool the central portion of the reflecting mirror, at which the laser beam is reflected.

To attain the above object of the invention, there is provided a reflecting mirror cooling device, which comprises a holder, a reflecting mirror accommodated in the holder for reflecting a laser beam, and a porous member also accommodated in the holder for permitting flow of a cooling medium and having a high thermal conductivity, the porous member being in contract with the back side of the reflecting mirror opposite a laser beam reflecting surface, the porous member having a bore coincident with the center of the reflecting surface, at which the laser beam is reflected, and open on the side opposite the reflecting mirror, the reflecting mirror cooling device being further provided with a fluid passage for supplying a cooling fluid into the bore of the porous member and a discharge passage for discharging the cooling medium having flown the bore in the porous member through the porous member to the outer periphery thereof.

With this construction, sufficient heat exchange between cooling fluid having flown through the porous member in contact with the reflecting mirror and the reflecting mirror can be obtained to improve the cooling capacity, while at the same time increasing the flow of cooling fluid to the reflecting portion of the reflecting mirror which is most readily heated by the laser beam. The reflecting portion thus can be sufficiently cooled.

The above and other objects and features of the invention will become more apparent from the description of the embodiments of the invention when the same is read with reference to the accompanying drawings.

DETAILED DESCRIPTION OF THE EMBODIMENTS

Figure 1:
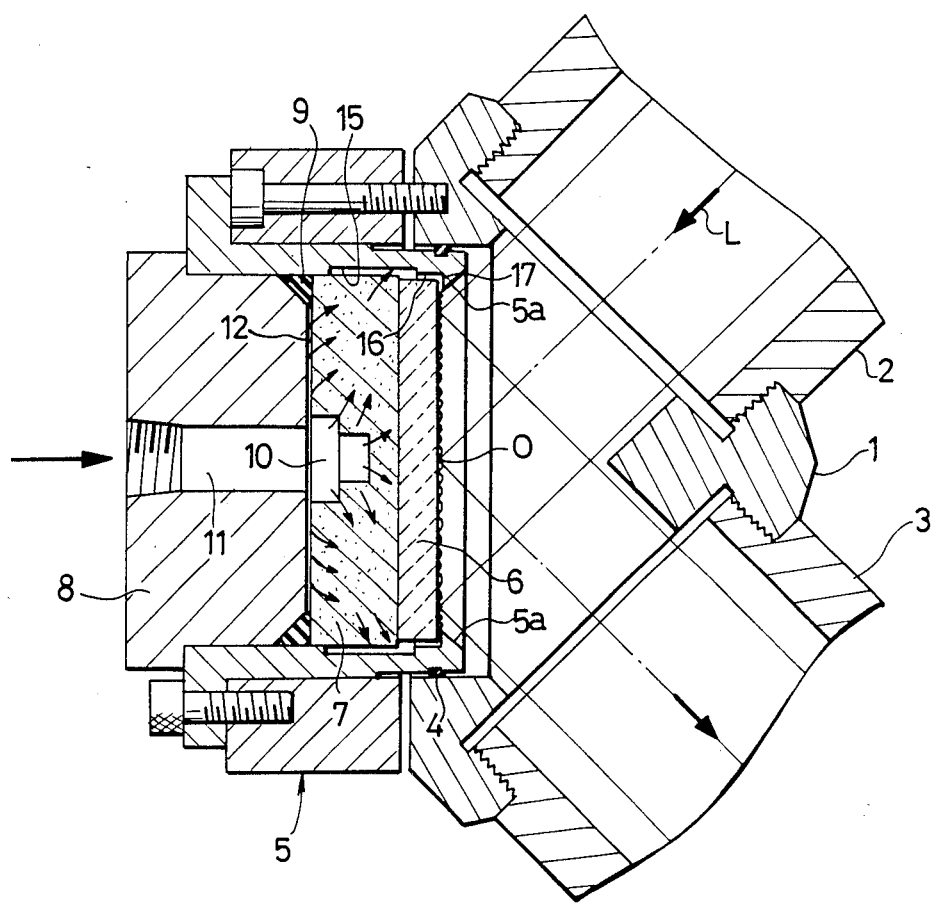
FIG. 1 is a sectional view showing an embodiment of the invention.

Now, the invention will be described in conjunction with preferred embodiments thereof with reference to the drawings. FIG. 1 shows an embodiment of the invention. Reference numeral 1 designates a bracket having a triangular sectional profile having two sides, to which hollow cylindrical members are secured at a predetermined angle with each other, the cylindrical members defining laser beam paths 2 and 3 for a laser beam L. On the remaining side of the bracket 1 is mounted a substantially cylindrical holder 5. The holder 5 is loosely fitted on a seal member 4 which is hermetically coupled to the bracket 1. The holder 5 has a support section 5a provided at the right and extending radially inwardly. The suport section 5a supports the edge of a reflecting surface of a reflecting mirror 6 accomodated in the holder 5.

The mirror 6 reflects the laser beam L incident along the axis of the laser beam path 2 to the direction coincident with the axis of the other laser beam path 3. In order that the laser beam be reflected accurately, an adjusting mechanism (not shown) is provided for adjusting the inclination angle of the holder 5 with respect to the bracket 1.

In contact with the back side of the mirror 6 is a disk-like porous member 7, for instance consisting of sintered copper or like metal having high thermal conductivity. The porous member 7 is permeable to cooling air. The mirror 6 and porous member 7 are secured to the holder 5 by a plug 8, which is disposed on the back side of the porous member 7 and is mounted in the holder 5, and a seal member 9, which is provided in an edge space between the porous member 7 and holder 8.

The porous member 7 has a bore 10 conicident with the center of the mirror 6, at which the laser beam L is reflected, and open on the side opposite the mirror 6. In this embodiment, the bore 10 is stepped bore having a reduced diameter portion on the side of the mirror 6. The plug 8 has a cooling air path 11 formed coaxially with the bore 10. The cooling air path 11 is communicated with a cooling air source through a duct (not shown) connected to the plug 8. Cooling air can be supplied from the cooling air source into a gap or space 12 formed between the porous member 7 and plug 8 by the seal member 9 as well as into the bore 10.

The stepped bore 10 may be formed as such in the porous member 7 which is a one-piece member as shown. Alternatively, the porous member 7 may consist of three layers bonded together, with the layer nearest the mirror 6 formed with no bore and the other two layers formed with holes of different diameters greater on the side of the plug 8.

The inner periphery of the holder 5 is formed with an annular recess or groove 15, which strides the outer peripheries of the porous member 7 and mirror 6 within the widths thereof. The holder inner periphery is also formed with a plurality of axial grooves 16 communicating with the annular groove 15 and extending up to the reflecting surface of the mirror 6. The inner periphery of the support section 5a supporting the edge of the reflecting surface of the mirror 6, i.e., the surface in contact with the mirror 6, is formed with a plurality of radial grooves 17 communicating with the axial grooves 16.

With this structure, cooling air supplied into the cooling air path 11 of the plug 8 flows through the path 11 into the space 12 and bore 10 in the porous member 7. From the space 12 and bore 10 it flows through the porous member 7 into the radially outer annular groove 15. The cooling air flowing into the annular groove 15 flows along the axial grooves 16 and then the radial grooves 17 formed in the holder 5 and then along the reflecting surface of the mirror 6 toward the center thereof to enter the laser beam paths 2 and 3.

The porous member 7 in contact with the mirror 6 consists of a material of high thermal conductivity, e.g., copper or like metal, and cooling air can flow through the porous member 7. Thus, the heat of the mirror 6 can be satisfactorily transferred to the porous member 7, and satisfactory heat exchange is realized between the porous member 7 and cooling air owing to large contact area between the porous member 7 and cooling air. The mirror 6 thus can be cooled efficiently by the cooling air.

Further, the porous member 7 has the bore 10 which coincides with the center 0 of the mirror 6 at which the laser beam L is reflected. If the bore 10 is not provided, most of the cooling air entering the gap 12 tends to flow into the annular groove 15 along the outer periphery of the porous member 7 offering less resistance against flow. Therefore, particularly the center 0 of the reflecting surface, at which the laser beam is reflected and which is readily heated by the laser beam, is liable to be cooled insufficiently. With the bore 10 provided, the resistance of the central portion of the porous member 7 against flow is reduced to increase flow of cooling air in that portion. Thus, the central portion of the reflecting surface noted above can be cooled sufficiently.

Further, the cooling air that flows from the radial grooves 17 noted above along the reflecting surface of the mirror 6 toward the center thereof, has an effect of preventing dust from being attached to the reflecting surface and also preventing condensation of moisture. Thus, the reflecting surface can be held clean for long time. Still further, the cooling fluid supplied into the laser beam paths 2 and 3 increases the inner pressure thereof beyond the atmospheric pressure. This has an effect of preventing dust in atmospheric air from entering the laser beam paths 2 and 3.

Figure 2:
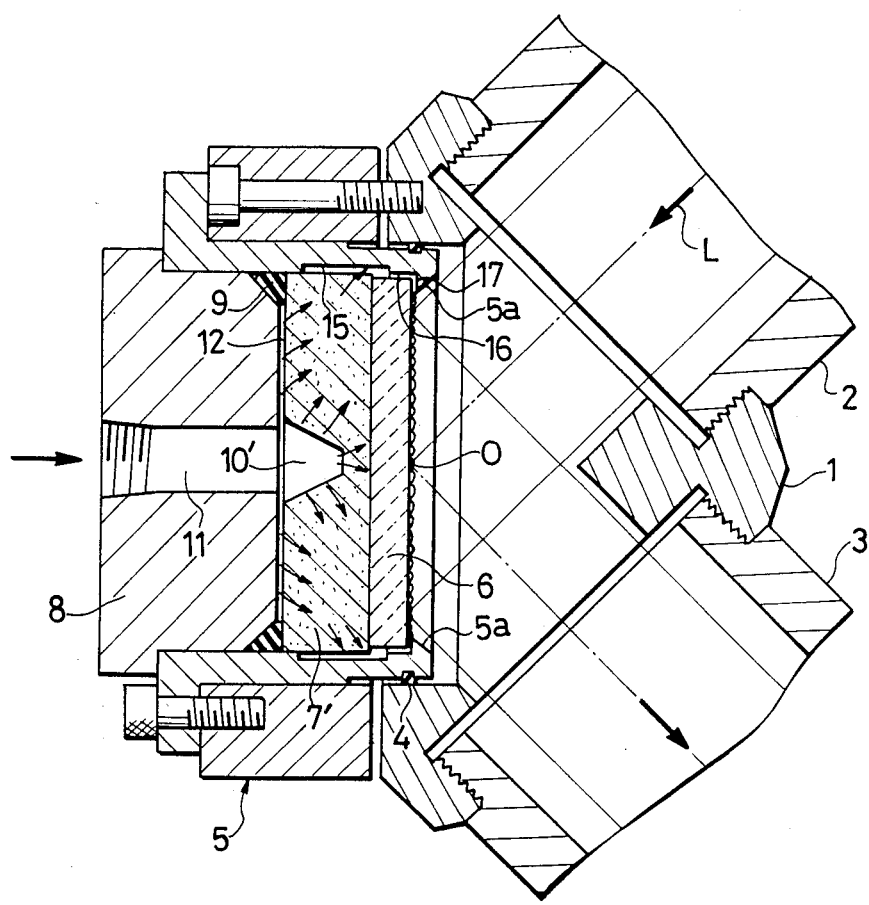
FIG. 2 is a sectional view showing a different embodiment of the invention.

FIG. 2 shows a different embodiment of the invention. In this embodiment, the porous member 7' is formed with a taping bore 10' tapering toward the mirror 6.

The rest of the structure is the same as in the preceding embodiment of FIG. 1, and parts like those in FIG. 1 are designated by like reference numerals. With this embodiment the same effects as in the previous embodiment obviously can be obtained.

The bore formed in the porous member may be a see-through bore reaching the back surface of the mirror. The grooves 16 and 17 are not essential and can be omitted.

Various other changes and modifications may be made in the details of the design without departing from the scope and spirit of the invention.

What is claimed is:

1. A reflecting mirror cooling device comprising a holder, a reflecting mirror accommodated in said holder for reflecting a laser beam, and a porous member also accommodated in said holder for permitting flow of a cooling medium and having a high thermal conductivity, said porous member being in contact with the back side of said reflecting mirror opposite a laser beam reflecting surface, said porous member having a bore coincident with the center of said reflecting surface, at which said laser beam is reflected, and open on the side opposite said reflecting mirror, said reflecting mirror cooling device being further provided with a fluid passage for supplying a cooling fluid into said bore of said porous member and a discharge passage for discharging the cooling medium having flown from said bore in said porous member through said porous member to the outer periphery thereof.

2. The reflecting mirror cooling device according to claim 1, wherein said holder has a radially inwardly projecting support portion for supporting the edge of the reflecting surface of said reflecting mirror, said discharge passage strides said porous member and said reflecting mirror within the widths of the outer peripheries thereof and consists of an annular groove formed in the inner periphery of said holder, axial grooves also formed in the inner periphery of said holder, said axial grooves communicating with said annular groove and extending to a position corresponding to the reflecting surface of said reflecting mirror, and radial grooves formed in said support portion and communicating with said axial grooves.

3. The reflecting mirror cooling device according to claim 1, wherein said bore is a blind bore.

4. The reflecting mirror cooling device according to claim 3, wherein said bore is a stepped bore with a smaller diameter portion provided on the side of said reflecting mirror.

5. The reflecting mirror cooling device according to claim 1, wherein said bore is a tapering bore with reducing diameter toward said reflecting mirror.

6. The reflecting mirror cooling device according to claim 1, whereis said porous member is made of a sintered metal.

7. The reflecting mirror cooling device according to claim 1, wherein said cooling fluid is air.

* * * * *